July 17, 1956     R. A. ARTHUR     2,754,745
PRESSURE REGULATING MECHANISM
Filed April 15, 1952
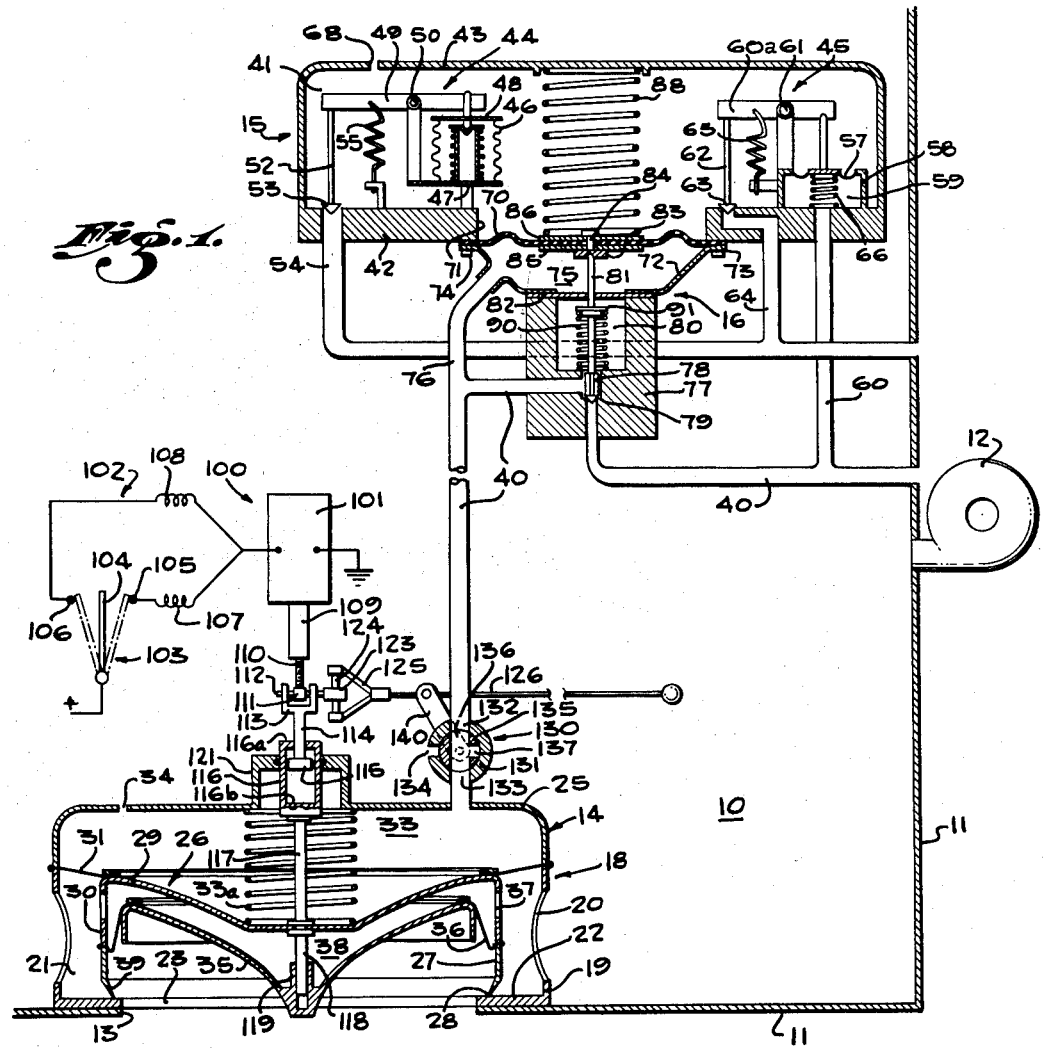
Fig. 1.
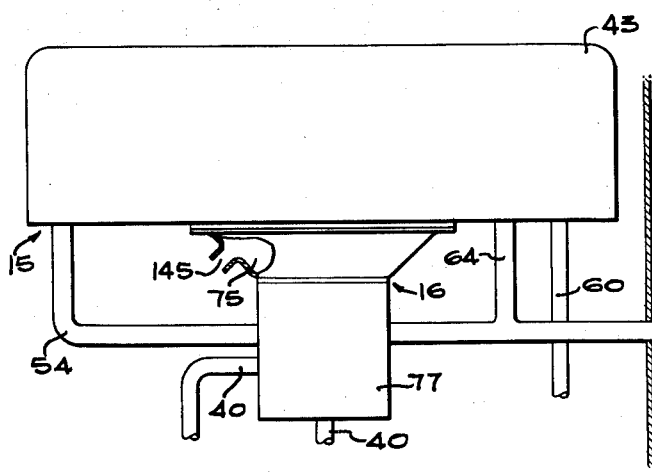
Fig. 2.
ROBERT A. ARTHUR,
INVENTOR.
BY 
ATTORNEY

United States Patent Office 2,754,745
Patented July 17, 1956

2,754,745
PRESSURE REGULATING MECHANISM

Robert A. Arthur, Palos Verdes Estates, Calif., assignor to The Garrett Corporation, Los Angeles, Calif., a corporation of California Application April 15, 1952, Serial No. 282,397

25 Claims. (Cl. 98—1.5)

This invention relates generally to pressure control mechanisms, and relates more particularly to mechanisms for controlling the pressure within an enclosure.

While the invention has particular utility in connection with the pressurized ventilation of aircraft cabins and the like and is shown and described herein as embodied in such a conditioning system, it is to be understood that its utility is not limited thereto.

It is sometimes desirable in pressurized aircraft cabins to have a relatively large outflow control valve or a plurality of said valves but the use of such large valves involves difficulties or problems, particularly in the control thereof.

For example, the air metering valves of regulator mechanisms are usually relatively small and do not have sufficient flow capacity for properly controlling large outflow valves so that in operation such large outflow valves may either overtravel or may have an undesirable lag. Such overtravel or lag is particularly noticeable where the control mechanism is remotely positioned with respect to said outflow valves.

It is, therefore, an object of the present invention to provide a pressure control mechanism which will overcome or solve the above difficulties or problems.

Another object of the invention is to provide mechanism of this character which will reduce to a minimum the transitional range from the unpressurized to the isobaric range.

Still another object of the invention is to provide mechanism of this character which will permit the use of standard regulator mechanism containing relatively small metering valves to work or control outflow valves which have a large capacity.

A further object of the invention is to provide mechanism of this character wherein standard regulating mechanisms will effect rapid response of such large flow capacity valves.

A still further object of the invention is to provide mechanism of this character whereby changes in regulator head pressure will be magnified to effect rapid changes in pressure in the head of the outflow valve.

Another object of the invention is to provide mechanism of this character whereby rapid changes in the outflow valve head pressure will be effected in response to increasing changes in regulator head pressure so that said outflow valve will be controlled in such a manner as to control cabin pressure and cause the latter to follow regulator head pressure.

Still another object of the invention is to provide a pneumatic means whereby the foregoing objects will be effected.

A further object of the invention is to provide pressure control mechanism wherein there is means for positively opening and closing the outflow control valve.

A still further object of the invention is to provide power driven actuating means for thus opening the outflow valve.

Another object of the invention is to provide means whereby the outflow valve may be quickly closed under emergency conditions.

Still another object of the invention is to provide mechanism of this character wherein the actuator may be quickly disconnected from the valve and the chamber in the valve head connected with a sufficiently high pressure to effect closing of said valve.

Other objects and advantages of the invention will be apparent from the following part of the specification.

Referring to the drawings, which are for illustrative purposes only:

Fig. 1 is a diagrammatic or schematic view of a pressure control mechanism or system embodying the present invention and installed in aircraft cabin; and Fig. 2 is a side elevation, partly in section, showing an alternative arrangement of a portion of the mechanism.

Referring more particularly to Fig. 1, there is shown an aircraft cabin, indicated generally at 10, having walls 11. Air is supplied to the cabin 10 by any suitable means such as a supercharger 12 or other mechanism which will deliver air under pressure. The supercharger may be operated by the main power plant or plants of the aircraft or may be operated by any suitable auxiliary engine or source of power.

One of the walls 11 of the cabin is provided with an outflow opening 13 controlled by an outflow valve indicated generally at 14. The valve 14 is controlled by regulator means, indicated generally at 15, through relay means, indicated generally at 16, which is connected to said valve 14.

The outflow valve 14 may be of any suitable type, the one herein illustrated being of the general type disclosed in the copending application of Richard A. Fischer, which is for a Pneumatic Valve, Serial No. 33,845, filed June 18, 1948. This valve is balanced and comprises a valve body, indicated generally at 18, having an annular wall 19 provided with openings 20 therein providing communication between the interior 21 of the valve body 18 and the cabin. The valve body has a valve seat member 22 about a valve opening 23, said seat member 22 being secured to the wall of the cabin by any suitable means, not shown, so that the opening 23 is in register with the opening 13 in the cabin wall. The outflow valve is provided with a casing 25. Within the body of the valve is disposed a pressure responsive control element, indicated generally at 26, which includes a movable valve member 27 having its free end 28 engageable with the valve seat member 22 for controlling the flow of air between the cabin and atmosphere. The assembly 26 also includes a plate member 29 having a downturned flange 30, as shown in Fig. 1, and to which the valve member 27 is secured adjacent the free edge thereof. The plate member 29 is secured to a diaphragm 31, which may also be considered as part of the pressure responsive control element and which has an outer peripheral edge portion clamped between the wall 19 of the body 18 and the free edge of the casing 25 to thereby define an operating pressure chamber 33, which may also be termed the outflow valve head, said head or chamber 33 being connected with a source of higher pressure, which is shown as the cabin, by means of a restricted bleed or vent 34. Within the assembly 26 is disposed a fixed baffle 35 of smaller diameter than the internal diameter of the flange 30 and valve member 27 which is connected to the assembly 26 by means of a flexible diaphragm 36 which has an external marginal portion clamped between the flange 30 and valve member 27 and an internal peripheral portion secured to the baffle 35 adjacent the outer periphery thereof. Openings 37 in the flange 30 provide communication between the interior 21 of the body 18 wherein cabin pressure prevails and a chamber 38 defined by the baffle 35, diaphragm 36, flange 39 and plate 29 so that the side of the plate 29, opposite the chamber 33, is subjected to cabin pressure as well as the corresponding side of the diaphragm 31. The device is balanced as to atmospheric pressure by means of the flange 39 thereof and a portion of the diaphragm 36. The flange 39 has an area which is substantially equal to the above referred to portion of the diaphragm 36 and the areas thereof are oppositely arranged so that atmospheric pressure acting thereon has no effect in moving the valve in either opening or closing direction. As the upper sides of the plate 29 and diaphragm 31, as shown in Fig. 1, are subjected to pressure in the control chamber 33 and the force of a spring 33a and the opposite sides of these parts are subjected to cabin pressure, variations in either of said pressures will effect movement of the assembly 26 and, by controlling the pressure in the chamber 33, the operation of the valve 14 may be controlled.

Where the valve 14 is of relatively large size, difficulty is encountered in controlling said valve by means of the usual regulator mechanism 15 which has relatively small metering valves. This difficulty is overcome by means of the pneumatic relay 16 which controls a connection 40 between the chamber 33 and a region of lower pressure shown herein as ambient atmosphere.

Alternatively, said region may be a vacuum, which may be produced by a vacuum pump connection in the conduit between the relay valve 16 and the junction of said conduit and the conduit 60. Other arrangements may be employed for connecting the chamber 33 with such a vacuum pump which would be between said relay valve and ambient atmosphere, it being understood that chamber 59 of the differential pressure responsive device 45 would have a connection to atmosphere and not to said vacuum pump.

The regulator mechanism 15, which is shown diagrammatically, comprises a control pressure chamber 41 defined by a base 42 and cover 43. While any suitable well-known pressure regulating mechanism may be included in the regulator 15, there is shown an isobaric control mechanism, indicated generally at 44, and a differential control mechanism, indicated generally at 45.

The mechanism 44 includes an evacuated bellows 46 having one end 47 fixed and the opposite end 48 movable and operably connected to a lever 49 pivoted at 50 intermediate the ends thereof. The bellows 46 acts on one end of the lever 49, the opposite end of said lever being operably connected to a metering valve member 52 having a head 53 which controls a connection 54 between the chamber 41 and ambient atmosphere. A spring 55 is provided for the mechanism 44 and functions in the usual manner.

The differential pressure control mechanism 45 includes a differential pressure responsive element or diaphragm 57 secured to a wall 58 upstanding from the base 42. Wall 58 and diaphragm 57 define a chamber 59 which is connected to the conduit 40 by means of a conduit 60 so that the chamber 59 is thereby connected to ambient atmosphere and, hence, one side of the diaphragm 57 is subjected to said atmospheric pressure, the other side of said diaphragm being subjected to pressure in the chamber 41. Diaphragm 57 is connected to a lever 60a adjacent one end thereof, said lever being pivoted at 61 intermediate the ends thereof. The opposite end of the lever 60a is operably connected to a metering valve member 62 having a valve head 63 controlling outflow from the chamber 41 through a conduit 64, which is connected to the conduit 54, the mechanism 45 being provided with a spring 65 for loading same in the well-known manner. A spring 66 may also be provided to load the diaphragm 57. There is a calibrated restricted bleed or vent opening 68 connecting the chamber 41 with a region of higher pressure which, in the present case, is shown as cabin pressure. Air from the chamber 41 flows to ambient atmosphere through the conduit 54 or 64 under the control of the respective mechanisms 44 and 45 so that pressure in the control pressure chamber 41 is determined and controlled by the said mechanisms 44 and 45.

It is to be understood, of course, that other types of devices may be used for controlling the pressure in the control chamber 41. For example, a ratio controlled device may be used for maintaining a predetermined ratio between the pressure in said pressure chamber 41 and external atmospheric pressure. It is to be further understood that various combinations of pressure control devices may be used for variously controlling the pressure in said chamber 41.

The relay mechanism, which directly controls the pressure in the head 33, includes a pressure responsive element, shown as a flexible diaphragm 70, which has one side exposed to the pressure in the control chamber 41 through an opening 71 in the base 42. At the opposite side of the diaphragm 70 is a dish-shaped housing 72 having a flange 73 extending outwardly. The diaphragm 70 is marginally clamped between the base 42 and flange 73 by means of bolts 74 or the like and said housing and diaphragm define a relay pressure chamber 75 which is connected to the conduit 40 by means of a conduit 76. The conduit 76 is connected to the conduit 40 between the relay mechanism and the outflow valve so that the pressure in chamber 75 is the same or substantially the same as the pressure in the head 33. Thus the diaphragm 70 is subjected on one side to pressure in the chamber 41 and on the opposite side to the pressure in the chamber 75 and is responsive to variations in the pressure differential between said pressures.

The relay 16 includes a valve seat member 77 through which the conduit 40 extends and is controlled by the movable valve member 78 which is slidable in a bore 79 provided therefor in the seat member 77. The seat member 77 is provided with an enlarged chamber 80 through which valve stem 81 of the valve 78 extends. The valve stem 81 passes through a plate 82 disposed between the seat member 77 and the housing 72 and has its upper end, as shown in Fig. 1, received in a recess in the head 83 of a rivet 84 which also serves to secure plates 85 and 86 to the diaphragm 70. Plates 85 and 86 are disposed on opposite sides of said diaphragm at the center thereof and provide reinforcing means for the central area of said diaphragm. A spring 88, located in the chamber 41, reacts between the plate 86 and the wall of the housing 43 opposite the diaphragm 70. The spring 88 urges the diaphragm downwardly, as shown in Fig. 1, and, hence, urges the valve 78 in the closing direction. A spring 90 is disposed between the valve stem 81 within the chamber 80 and reacts between the bottom of said chamber and a spring retainer 91 secured to the stem 81 in spaced relationship to the plate 82, said spring 90 urging the valve 78 in the opening direction and maintains the upper end of the valve stem 81 within the notch provided in the rivet head 83 but with less force than exerted by spring 88.

Whenever pressure in the control pressure chamber 41 changes in value, the diaphragm 70 will move to effect movement of the head 78 of the relay valve mechanism and inasmuch as the relay valve is substantially larger than the metering valves of the device controlling the pressure in chamber 41, the pressure in the head 33 of the outflow valve will change rapidly.

There are other means by which the pressure in head 33 is changed rapidly: (1) the metering pin 78 moves a lot further than the metering pin which causes the change of pressure in head 41; (2) the metering pin 78 may be connected to the above referred to vacuum source through line 40 between the relay valve and atmosphere, if isolated from line 60.

The changes in the pressure in the head 33 of the outflow valve 14 follow the changes in the pressure in chamber 41 rather closely and effect opening or closing movement of the outflow valve member 27 in accordance with the changes in the head pressure. Thus the outflow of air from the cabin is controlled and will closely follow any changes in the pressure in the control chamber 41.

There is also means for positively opening and closing the balanced valve part of the outflow valve 14 and the positive opening mechanism is indicated generally at 100. The mechanism 100 includes a motor driven actuator 101 supplied with electrical current from any suitable source through a wiring system, indicated generally at 102, said wiring system including a switch 103 having a switch member 104 which is manually movable between fixed contacts 105 and 106 for connecting the source of power with one or the other of the motor coils 107 and 108 respectively to thereby effect operation of the movement in one direction or another. The actuator includes the rotatable sleeve 109 which is operated by the motor of said actuator and an axially movable threaded screw 110 threadably received within the sleeve 109. The screw 110 is provided at its outer end with a transversely bored head 111 slidably receiving a pin 112 which extends between the arms of a yoke 113 and which is slidably received in openings provided therefor in the arms of said yoke. The yoke is disposed at the outer end of a rod 114 having a head 115 slidable within a cylindrical chamber 116 which is attached to a rod 117 connected to the plate 29 of the valve assembly 26. Rod 117 has an extension 118 which is slidable in a guide 119 of the baffle 35. Spring 33a is disposed about the rod 117 and sleeve 116 is slidable in the outer wall of a housing 121 which forms an extension of the casing 25.

Pin 112 is provided at one end with a collar 123 slidable on a bar 124 connected at its ends to the arms of a clevis 125 secured to a manually operable cable 126.

Interposed in the conduit 40, between the relay and the outflow valve 14, is a valve, indicated generally at 130. The valve 130 includes a housing 131 with aligned openings 132 and 133 and a lateral opening 134. Within the housing 130 is a rotatable valve member having a passage 136 and a lateral passage 137. The valve member 135 has an arm 140 connected to the cable 126 and normally the diametrical passage 136 provides a connection between the head 33 of the outflow valve 14 and the relay, the lateral passage 137 being then closed.

It is to be noted that the connection between the actuator 101 and the outflow valve member has a lost motion which permits independent movement of the valve under normal conditions. Under these conditions, the head 115 is located in spaced relation to the end walls 116a and 116b of the sleeve 116. Should it be desired to positively open the valve 27, the switch member 104 is moved to the fixed contact member 105 to effect actuation of the actuator motor for retracting the screw 110 and effecting positive opening movement of the valve member 27.

As the yoke 113 moves upwardly, as shown in Fig. 1, the clevis 125 will follow due to the flexing of the cable 126. It is to be understood, of course, that the actuator 101 may have a limit switch mechanism which limits the longitudinal movement of the screw 110 so as to prevent damage to the mechanism when the full open or close valve position is reached. Movement of the switch member 104 to the contact 106 will effect reverse operation of the actuator mechanism to return the head 115 to the position shown in Fig. 1. Under some conditions, it is desirable to effect positive closing of the outflow valve as, for example, when $CO_2$ is admitted to the cabin for fire control. This mechanism includes the pin 112 and the valve 130 and when it is desired to effect such positive closing of the outflow valve 14, the cable 126 is manually moved to the right, as shown in Fig. 1, thereby pulling the pin 112 from the yoke 113 and the head 111 of the screw 110 thereby disconnecting the actuator from the movable valve member. Simultaneously, arm 140 is moved in the clockwise direction whereby member 135 of the valve 130 is rotated 90° so that the head 33 of the valve 14 is connected to the cabin by way of the lateral bore 137, the passage 136 and the opening 134 of the valve 130. This positioning of the valve 130 provides free communication between the head 33 and the cabin so that the pressure in head 33 is substantially cabin pressure acting on one side of the plate 29 and diaphragm 31. The opposite sides of said plate and diaphragm are also subjected to cabin pressure so that the spring 33a will quickly and positively close the outflow valve member 27.

The arrangement shown in Fig. 2 is similar to that shown in Fig. 1 except that a chamber 75 of the relay mechanism 16 is in open communication with the cabin by way of a passage 145. Thus, in the arrangement shown in Fig. 2, the diaphragm 70 of the relay mechanism is exposed on one side to the pressure in chamber 41 and on the opposite side to cabin pressure and said diaphragm is responsive to variations in the differential of pressure between that in the control chamber 41 and cabin pressure.

I claim:

1. In pressure control mechanism for controlling the pressure in an enclosure: walls defining a control pressure chamber having an inlet connection with the enclosure and an outlet connection with ambient atmosphere; a pilot valve controlling the outlet connection; pressure control means for said pilot valve including pressure responsive means responsive to pressure in said control chamber; outflow valve means for said enclosure including a pressure sensitive element and valve member controlled thereby, one side of said pressure sensitive element being subjected to enclosure pressure; walls defining a chamber having an operating pressure, the other side of said pressure sensitive element being subjected to said operating pressure, said chamber for the operating pressure having an inlet from the enclosure and a connection with ambient atmosphere; yielding means urging the pressure sensitive element in a direction to effect closing of the outflow valve; a relay valve controlling the connection between the outflow valve operating pressure chamber and atmosphere; a pressure responsive element for controlling the relay valve and thereby controlling the operating pressure, said pressure responsive element having one side subjected to control chamber pressure; actuator means including an actuating member; a lost motion connection between said actuating member and outflow valve member; releasable means for disconnecting the actuating member from the outflow valve member; a second valve in the connection between the outflow valve operating pressure chamber and atmosphere, said second valve being adapted to cut off the connection with ambient atmosphere and connect the outflow valve operating pressure chamber with the enclosure; and manual means connected with the releasable means and said second valve for simultaneously disconnecting the actuator from the outflow valve and actuating the second valve to provide a connection between said outflow valve chamber and the enclosure.

2. In pressure control mechanism for controlling the pressure in an enclosure: walls defining a control pressure chamber having an inlet connection with the enclosure and an outlet connection with ambient atmosphere; a pilot valve controlling the outlet connection; pressure control means for said pilot valve including pressure responsive means responsive to pressure in said control chamber; outflow valve means for said enclosure including a pressure sensitive control element and valve member, one side of said pressure sensitive control element being subjected to enclosure pressure; walls defining a chamber having an operating pressure, the other side of said pressure sensitive element being subjected to said operating pressure, said chamber for the operating pressure having an inlet from the enclosure and a connection with ambient atmosphere; yielding means urging the pressure sensitive element in a direction to effect closing of the outflow valve; a relay valve controlling the connection between the outflow valve operating pressure chamber and atmosphere; a pressure responsive element for controlling the relay valve and thereby controlling the operating pressure, said pressure responsive element having one side subjected to control chamber pressure and the opposite side subjected to said operating pressure; actuator means including an actuating member; a lost motion connection between said actuating member and outflow valve member; releasable means for disconnecting the actuating member from the outflow valve member; a second valve in the connection between the outflow valve operating pressure chamber and atmosphere, said second valve being adapted to cut off the connection with ambient atmosphere and connect the outflow valve operating pressure chamber with the enclosure; and manual means connected with the releasable means and said second valve for simultaneously disconnecting the actuator from the outflow valve and actuating the second valve to provide a connection between said outflow valve chamber and the enclosure.

3. In pressure control mechanism for controlling the pressure in an enclosure: walls defining a control pressure chamber having an inlet connection with the enclosure and an outlet connection with ambient atmosphere; a pilot valve controlling the outlet connection; pressure control means for said pilot valve including pressure responsive means responsive to pressure in said control chamber; outflow valve means for said enclosure including a pressure sensitive control element and valve member, one side of said pressure sensitive control element being subjected to enclosure pressure; walls defining a chamber having an operating pressure, the other side of said pressure sensitive element being subjected to said operating pressure, said chamber for the operating pressure having an inlet from the enclosure and a connection with ambient atmosphere; yielding means urging the pressure sensitive element in a direction to effect closing of the outflow valve; a relay valve controlling the connection between the outflow valve operating pressure chamber and atmosphere; a pressure responsive element for controlling the relay valve and thereby controlling the operating pressure, said pressure responsive element having one side subjected to control chamber pressure and the opposite side being subjected to enclosure pressure; actuator means including an actuating member; a lost motion connection between said actuating member and outflow valve member; releasable means for disconnecting the actuating member from the outflow valve member; a second valve in the connection between the outflow valve operating pressure chamber and atmosphere, said second valve being adapted to cut off the connection with ambient atmosphere and connect the outflow valve operating pressure chamber with the enclosure; and manual means connected with the releasable means and said second valve for simultaneously disconnecting the actuator from the outflow valve and actuating the second valve to provide a connection between said outflow valve chamber and the enclosure.

4. In pressure control mechanism for controlling the pressure in an enclosure: walls defining a control pressure chamber having an inlet connection with the enclosure and an outlet connection with ambient atmosphere; a pilot valve controlling the outlet connection; pressure control means for said pilot valve including pressure responsive means responsive to pressure in said control chamber; outflow valve means for said enclosure including a pressure sensitive control element and valve member, one side of said pressure sensitive control element being subjected to enclosure pressure; walls defining a chamber having an operating pressure, the other side of said pressure sensitive element being subjected to said operating pressure, said chamber for the operating pressure having an inlet from the enclosure and a connection with ambient atmosphere; yielding means urging the pressure sensitive element in a direction to effect closing of the outflow valve; a relay valve controlling the connection between the outflow valve operating pressure chamber and atmosphere; and a pressure responsive element for controlling the relay valve and thereby controlling the operating pressure, said pressure responsive element having one side subjected to control chamber pressure.

5. In pressure control mechanism for controlling the pressure in an enclosure: walls defining a control pressure chamber having an inlet connection with the enclosure and an outlet connection with ambient atmosphere; a pilot valve controlling the outlet connection; pressure control means for said pilot valve including pressure responsive means responsive to pressure in said control chamber; outflow valve means for said enclosure including a pressure sensitive control element and valve member, one side of said pressure sensitive control element being subjected to enclosure pressure; walls defining a chamber having an operating pressure, the other side of said pressure sensitive element being subjected to said operating pressure, said chamber for the operating pressure having an inlet from the enclosure and a connection with ambient atmosphere; yielding means urging the pressure sensitive element in a direction to effect closing of the outflow valve; a relay valve controlling the connection between the outflow valve operating pressure chamber and atmosphere; and a pressure responsive element for controlling the relay valve and thereby controlling the operating pressure, said pressure responsive element having one side subjected to control chamber pressure, and the opposite side being subjected to said operating pressure.

6. In pressure control mechanism for controlling the pressure in an enclosure: walls defining a control pressure chamber having an inlet connection with the enclosure and an outlet connection with ambient atmosphere; a pilot valve controlling the outlet connection; pressure control means for said pilot valve including pressure responsive means responsive to pressure in said control chamber; outflow valve means for said enclosure including a pressure sensitive control element and valve member, one side of said pressure sensitive control element being subjected to enclosure pressure; walls defining a chamber having an operating pressure, the other side of said pressure sensitive element being subjected to said operating pressure, said chamber for the operating pressure having an inlet from the enclosure and a connection with ambient atmosphere; yielding means urging the pressure sensitive element in a direction to effect closing of the outflow valve; a relay valve controlling the connection between the outflow valve operating pressure chamber and atmosphere; and a pressure responsive element for controlling the relay valve and thereby controlling the operating pressure, said pressure responsive element having one side subjected to control chamber pressure and the opposite side being subjected to enclosure pressure.

7. In pressure control mechanism: walls defining a control pressure chamber having an inlet connection and an outlet connection; pressure control means for said control chamber, said pressure control means including pressure responsive means having one side subjected to control chamber pressure and adapted to control the pressure in said chamber by controlling one of said connections; a pressure sensitive control element subjected on one side to a pressure to be controlled; walls defining a chamber for an operating pressure, the other side of said pressure sensitive control element being subjected to said operating pressure, said chamber having an inlet connection and an outlet connection; and relay means, including a pressure responsive element for controlling the operating pressure by controlling one of the connections of the chamber having said operating pressure, said pressure responsive element having one side subjected to control chamber pressure.

8. In pressure control mechanism: walls defining a control pressure chamber; pressure control means for said chamber, including pressure responsive means having one side subjected to control chamber pressure and adapted to control the pressure in said chamber; a pressure sensitive control element subjected on one side to a pressure to be controlled; walls defining a chamber for an operating pressure, the other side of said pressure sensitive control element being subjected to said operating pressure; relay means, including a pressure responsive element, for controlling the operating pressure, said pressure responsive element having one side subjected to control chamber pressure, said relay means including a valve controlling the flow of fluid relative to said operating pressure chamber; yielding means urging said valve in the closing direction; and lighter yielding means urging the valve in the opening direction.

9. In mechanism for controlling the pressure in an enclosure: walls defining a control pressure chamber; pressure control means for said control chamber, including a valve controlling the flow of fluid relative to said control chamber and fluid pressure responsive means subjected on opposite sides to control chamber pressure and ambient atmospheric pressure for controlling said valve; a pressure sensitive control element subjected on one side to enclosure pressure; walls defining a chamber for an operating pressure, the other side of said pressure sensitive control element being subjected to said operating pressure; and means, including a pressure responsive element, for controlling the operating pressure, said pressure responsive element having one side subjected to control chamber pressure and the other side subjected to enclosure pressure.

10. In mechanism for controlling the pressure in an enclosure: walls defining a control pressure chamber; pressure control means for said control chamber, including pressure responsive means controlling the flow of fluid relative to said control chamber; a pressure sensitive control element subjected on one side to enclosure pressure; walls defining a chamber for an operating pressure, the other side of said pressure sensitive control element being subjected to said operating pressure; and means, including a pressure responsive element, for controlling the operating pressure, said pressure responsive element having one side subjected to control chamber pressure and the other side subjected to operating pressure.

11. In pressure control mechanism: walls defining a control pressure chamber; means for controlling the pressure in said chamber, including pressure responsive means subjected on one side to control chamber pressure; a pressure sensitive control element subjected on one side to a pressure to be controlled; walls defining an operating pressure chamber, the other side of said pressure sensitive control element being subjected to said operating pressure, said operating pressure chamber having an inlet connection and an outlet connection; and means, including a pressure responsive element, for controlling one of said conections, said pressure responsive element having one side subjected to the pressure in said control chamber.

12. The invention defined by claim 11 wherein the last mentioned means controls the outlet connection.

13. In pressure control mechanism: walls defining a control pressure chamber; pressure control means for said control chamber, including pressure responsive means having one side subjected to control chamber pressure and adapted to control said pressure; a pressure sensitive control element subjected on one side to a pressure to be controlled; walls defining an operating pressure chamber, the other side of said pressure sensitive control element being subjected to said operating pressure; and relay means for controlling the pressure in said operating chamber, said relay means including a pressure responsive element subjected on one side to control chamber pressure.

14. The invention defined by claim 13 wherein the means for controlling the pressure in said control chamber controls the flow of fluid relative to said chamber.

15. The invention defined by claim 13 wherein the control pressure chamber has an inlet and an outlet and the pressure control means for said chamber includes means for controlling said outlet.

16. In mechanism for controlling the pressure in an enclosure: an outflow valve including a valve member and a pressure sensitive element controlling said valve member; means defining a chamber for an operating pressure, said pressure sensitive element being subjected on one side to enclosure pressure and on the opposite side to said operating pressure; yielding means urging the valve member in the closing direction; power actuating means for effecting opening of the valve member, means for releasing the valve member from said power actuating means; and means for simultaneously admitting enclosure pressure into said operating pressure chamber.

17. The invention defined by claim 16 wherein the operating pressure chamber has an inlet connection with the enclosure and an outlet connection with ambient atmosphere and there is means for controlling one of said connections.

18. The invention defined by claim 16 wherein there is a one-way connection between the power actuating means and the valve member.

19. In pressure control mechanism: a valve member for controlling fluid flow; a pressure responsive element for controlling said valve member, said element being subjected on one side to the pressure to be controlled; means defining a pressure chamber, the other side of said element being subjected to the pressure in said chamber; yielding means urging the valve member in the closing direction; power actuated means; a lost motion connection between said power actuated means and said valve member whereby said valve member may have normal operative movement, said actuator being adapted to open said valve member; and means for disconnecting said actuator from the valve element and simultaneously admitting a higher pressure into said chamber.

20. In means for controlling the pressure in an enclosure: walls defining a control pressure chamber; pressure control means for said control pressure chamber, including a valve adapted to control the flow of fluid relative to said control pressure chamber and a pressure responsive element responsive to pressure in said control pressure chamber and operable to control said valve; a pressure sensitive control element subjected on one side to enclosure pressure; walls defining a chamber for an operating pressure, the other side of said pressure sensitive control element being subjected to said operating pressure; and means for controlling the pressure in the operating chamber, said means including a second valve controlling the flow of fluid relative to said operating pressure chamber and a fluid pressure responsive element automatically controlling the position of said second valve and subjected on one side to pressure in said control pressure chamber and on the opposite side to operating pressure.

21. In mechanism for controlling the pressure in an enclosure: a pneumatically operated outflow valve having a chamber for an operating pressure, said chamber having a connection with a source of higher pressure and a connection with a region of lower pressure; a pneumatic relay controlling one of said connections, said relay having a pressure sensitive element subjected on one side to the pressure in said chamber; means defining a control pressure chamber having a connection with a source of higher pressure and a connection with a region of lower pressure, the other side of said pressure sensitive element being subjected to the pressure in said control pressure chamber; and pressure responsive means for controlling one of the connections of said control pressure chamber to thereby control the pressure in said chamber.

22. In mechanism for controlling the pressure in an enclosure: an outflow valve including means defining an operating pressure chamber having an inlet connection and an outlet connection; pressure responsive means controlling one of said connections; means defining a control pressure chamber having an inlet connection and an outlet connection, said pressure responsive means being subjected on one side to the pressure in said control pressure chamber and on the opposite side to the pressure in said operating pressure chamber; and a pressure responsive device subjected to the pressure in said control pressure chamber for controlling one of the connections of said control pressure chamber.

23. In pressure control mechanism: walls defining a control pressure chamber; pressure control means for said chamber including a valve controlling the flow of fluid relative to said chamber and pressure responsive means controlling said valve, said pressure responsive means being subjected to pressure in said control pressure chamber; a pressure sensitive control element subjected on one side to a pressure to be controlled; walls defining a chamber for an operating pressure, the other side of said pressure sensitive control element being subjected to said operating pressure; and relay means, including a pressure responsive element having one side subjected to control chamber pressure and the opposite side subjected to said operating pressure, said relay means controlling the flow of fluid relative to the chamber having said operating pressure.

24. In pressure control mechanism: walls defining a control pressure chamber; pressure control means for said chamber, including a valve adapted to control the flow of fluid relative to said chamber and pressure responsive means responsive to pressure in said control pressure chamber for controlling said valve, a pressure sensitive control element subjected on one side to a pressure to be controlled; walls defining a chamber for an operating pressure, the other side of said pressure sensitive control element being subjected to said operating pressure; and relay means, including a pressure responsive element having one side subjected to control chamber pressure and the opposite side subjected to said operating pressure, said relay means controlling the flow of fluid relative to the chamber having said operating pressure.

25. In a pressure control mechanism: walls defining a control pressure chamber; pressure control means for said control chamber, including pressure responsive means controlling the flow of fluid relative to said control chamber, said pressure responsive means being subjected on opposite sides to control chamber pressure and ambient atmospheric pressure and said pressure responsive means being automatically operable in response to variations in the differential of said pressures to vary said flow of fluid; a pressure sensitive control element subjected on one side to a pressure to be controlled; walls defining a chamber for an operating pressure, the other side of said pressure sensitive control element being subjected to said operating pressure; and relay means, including a pressure responsive element having one side subjected to control chamber pressure and the opposite side subjected to said operating pressure, said relay means controlling the flow of fluid relative to the chamber having said operating pressure.

References Cited in the file of this patent

UNITED STATES PATENTS

| | | |
|---|---|---|
| 2,393,343 | Schroeder | Jan. 22, 1946 |
| 2,450,881 | Cooper et al. | Oct. 12, 1948 |
| 2,498,633 | Arthur | Feb. 28, 1950 |
| 2,513,332 | Kemper | July 4, 1950 |
| 2,610,564 | Cooper et al. | Sept. 16, 1952 |
| 2,669,175 | Fischer | Feb. 16, 1954 |